April 7, 1953 R. W. GLASNER 2,633,765
FORMING PRESS
Filed Feb. 23, 1949 4 Sheets-Sheet 1

Inventor
Rudolph W Glasner
By: Spencer, Hargall, Johnston & Cook
Attys

April 7, 1953 R. W. GLASNER 2,633,765
FORMING PRESS
Filed Feb. 23, 1949 4 Sheets-Sheet 3

Inventor
Rudolph W Glasner
By Spencer, Margall, Johnston & Cook
Attys

April 7, 1953 R. W. GLASNER 2,633,765
FORMING PRESS
Filed Feb. 23, 1949 4 Sheets-Sheet 4
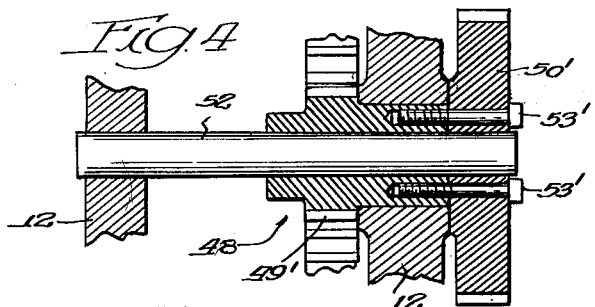
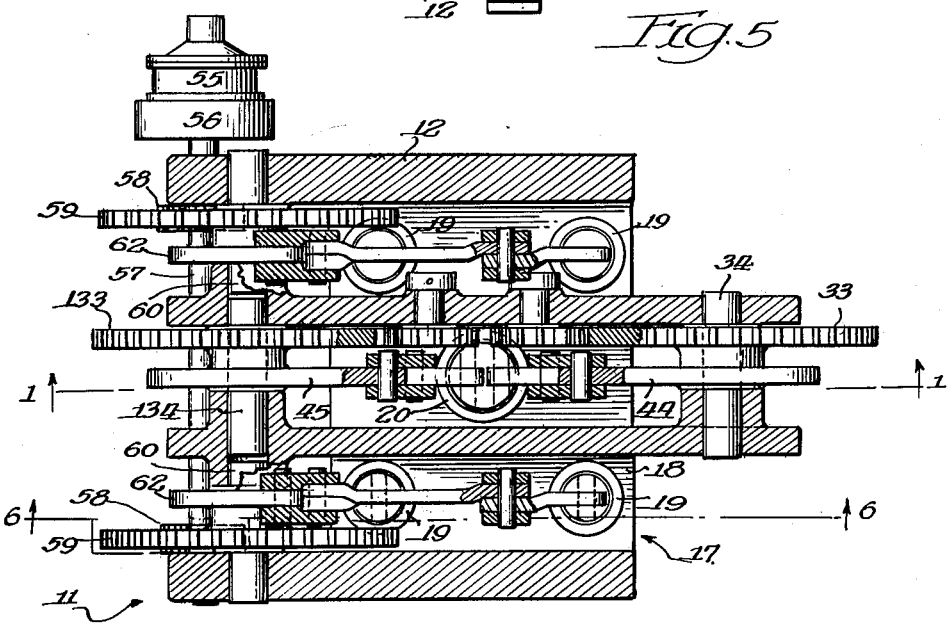
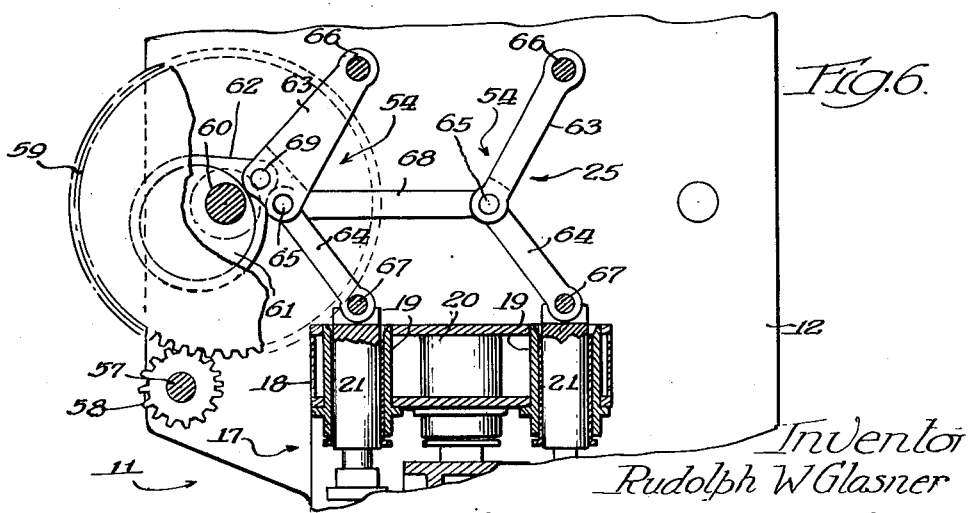
Inventor
Rudolph W Glasner
By: Spencer, Marzall, Johnston & Cook
Attys Patented Apr. 7, 1953

2,633,765

UNITED STATES PATENT OFFICE 2,633,765

FORMING PRESS

Rudolph W. Glasner, Chicago, Ill., assignor to Clearing Machine Corporation, Chicago, Ill., a corporation of Illinois Application February 23, 1949, Serial No. 77,712

8 Claims. (Cl. 78—23)

The present invention relates, in general, to the working of material, and has more particular reference to an improved press for forming material into desired shapes in appropriate dies; the invention having specific reference to a press especially well suited for the cold working of metal, although, of course, not necessarily limited to the material worked, nor the temperature at which the working is done.

In the working of metal and many other materials, great force is required to displace the work material to cause it to flow in desired fashion, particularly where "deep drawn" shapes are produced; and the present invention contemplates the provision of mechanism adapted to form material with speed and precision, whereby there will be substantially no excess material in the finished product, it being highly desirable and of great importance, in the mass production of formed articles of the sort here involved, that the original work piece be only slightly heavier than the finished article. Accordingly, it is an important general object of the present invention to provide a forming press adapted to operate on work material with such accuracy as to form substantially all of the work material into the finished product and thus eliminate the necessity of costly trimming or machine finishing operations, on the finished product, subsequent to its formation in the press, hence considerably reducing the cost of quantity manufacture of such articles.

Another important object is to provide an improved press having incorporated facilities whereby accurately to control the application of force to a work piece, to be formed, in order to accomplish the flow of material in desired fashion within the working cavity of the die; a further object being to provide a precision press especially adapted for use where appreciable movement of the work material is required with accuracy and precision, as in the production of so-called "deep drawn" shapes.

Another object is to provide a press wherein the material forming forces may be applied to the work piece at a desired rate during the forming stroke of the press, and wherein the application of the forming forces may be timed to occur at selected intervals during the operating stroke of the press, in order to accomplish a desired flow of the work material as in remote zones of a complicated die, the ability thus to accurately control the application of forming forces in the die resulting in improved operating efficiency through reduction of wastage of work material by making possible the use of work blanks of weight substantially equal to the weight of the material in the finished product.

Another important object of the invention is to provide a press operated by mechanically actuated means controlled in such fashion as to regulate or determine the flow of work material in more than one direction in the forming die.

Another important object of the invention is to provide a press having improved means for driving a forming member; a further object being to provide for application of driving force to the forming member in precise centralized relation in alignment with the axis of movement of the member, thereby minimizing lateral strains or forces on the forming member during its work stroke, so that the material being worked upon may receive maximum forming impact and will thus be caused to flow with speed and precision in a desired direction or directions in the forming die.

A further object is to utilize a toggle linkage, comprising multiple opposed toggles, in order to move the working member in its working stroke.

Another important object is to provide a press having opposed forming members in cooperative association with a forming die whereby forming forces may be applied to a work piece in the die in opposite directions; a further object being to provide means for operating opposed working members in a desired timed relationship, the one with respect to the other; a still further object being to provide for the adjustment or regulation of the relative timing of the operating strokes of the opposed forming members, whereby said members may be caused to operate either simultaneously or at any desired time delay interval, the one after the other, or vice versa.

The foregoing and numerous other important objects, advantages and inherent functions of the invention will become apparent as the same is more fully understood from the following description, which, taken in connection with the accompanying drawings, discloses preferred embodiments of the invention.

Referring to the drawings:

Fig. 4 is a sectional view on line 4—4 in Fig. 3;

Figure 1:
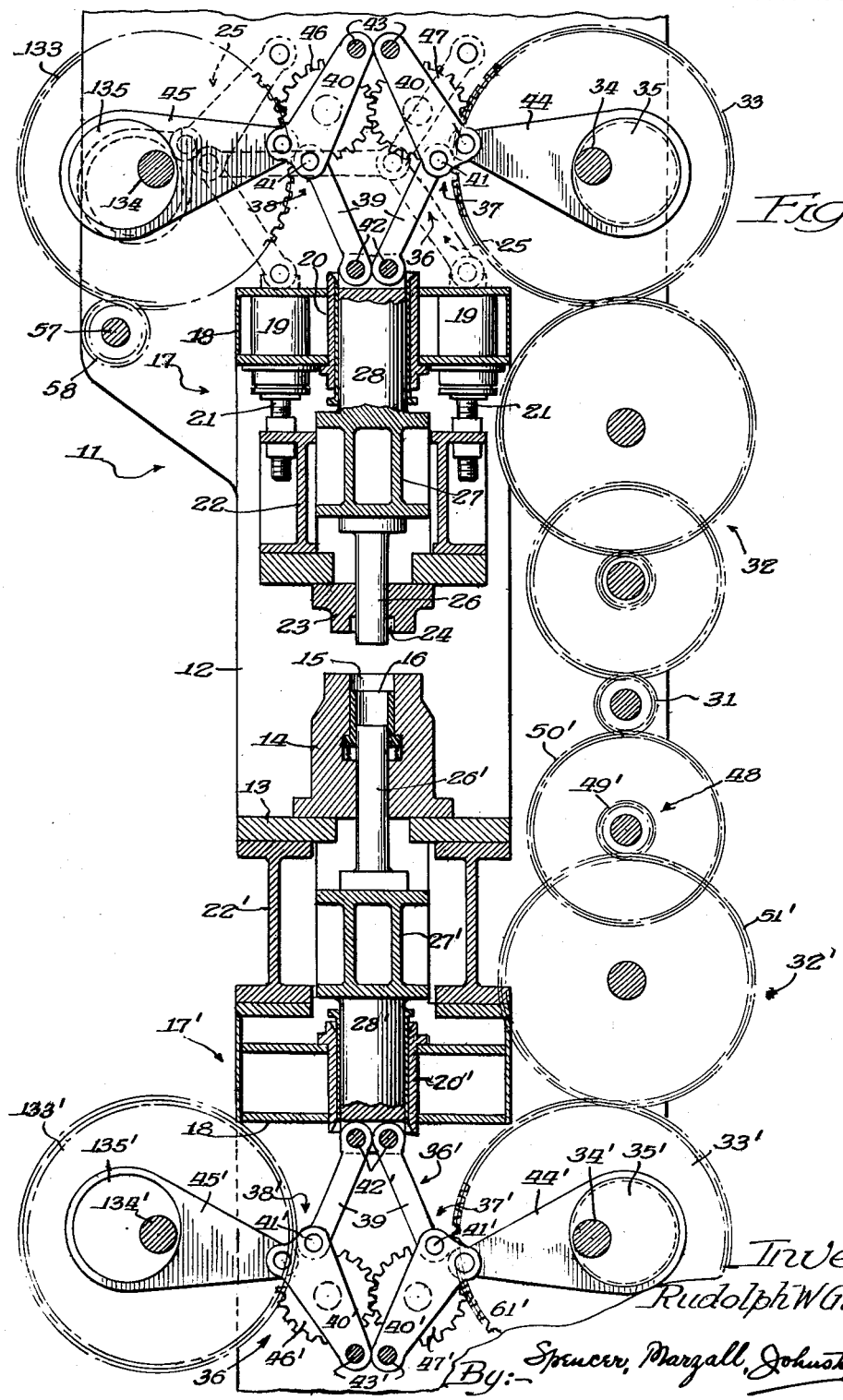
Fig. 1 is a sectional view taken through a forming press embodying the present invention, the press being shown in open position.
Figure 2:
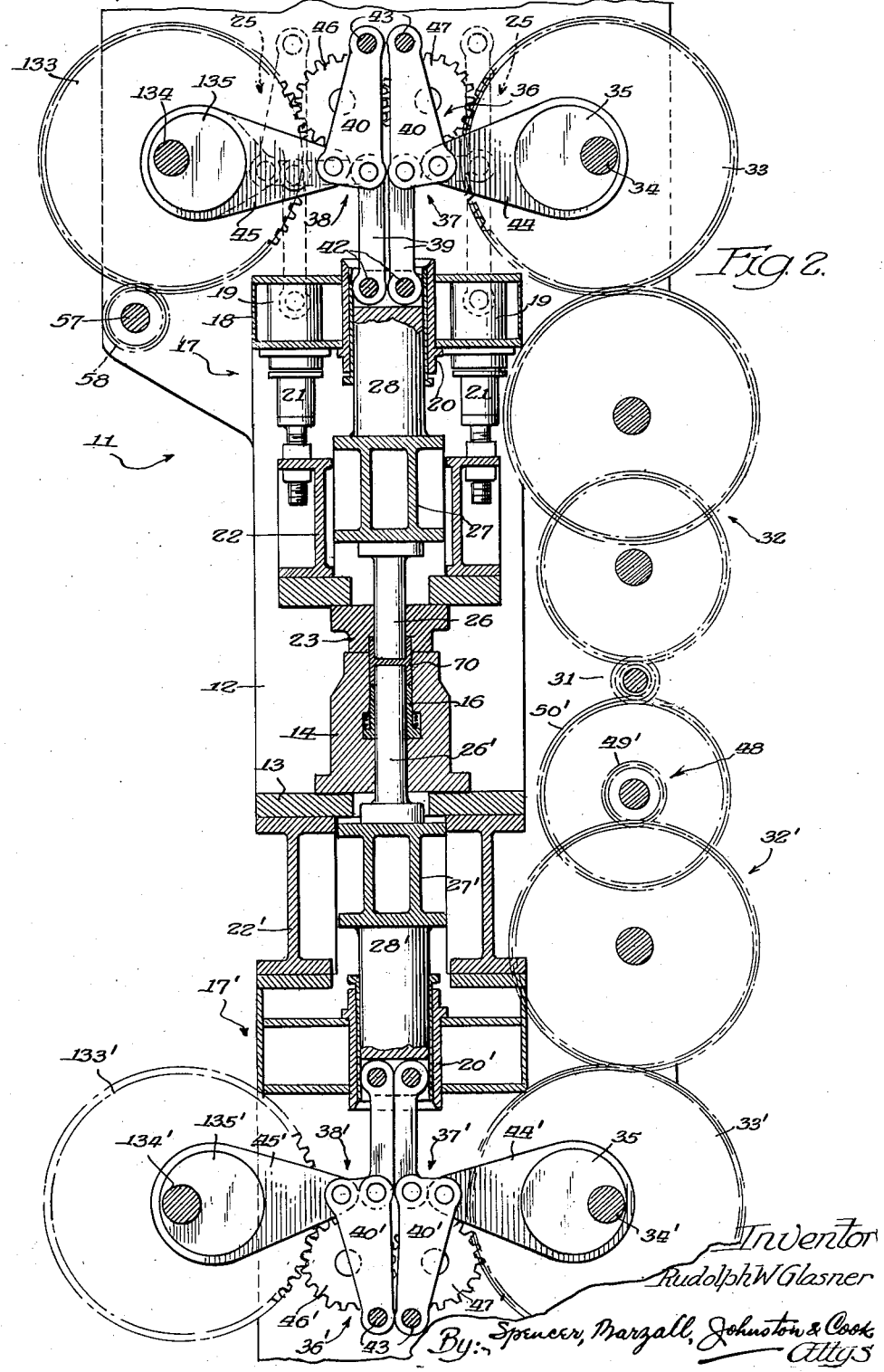
Fig. 2 is a sectional view, similar to Fig. 1, but showing the press in closed position.
Figure 3:
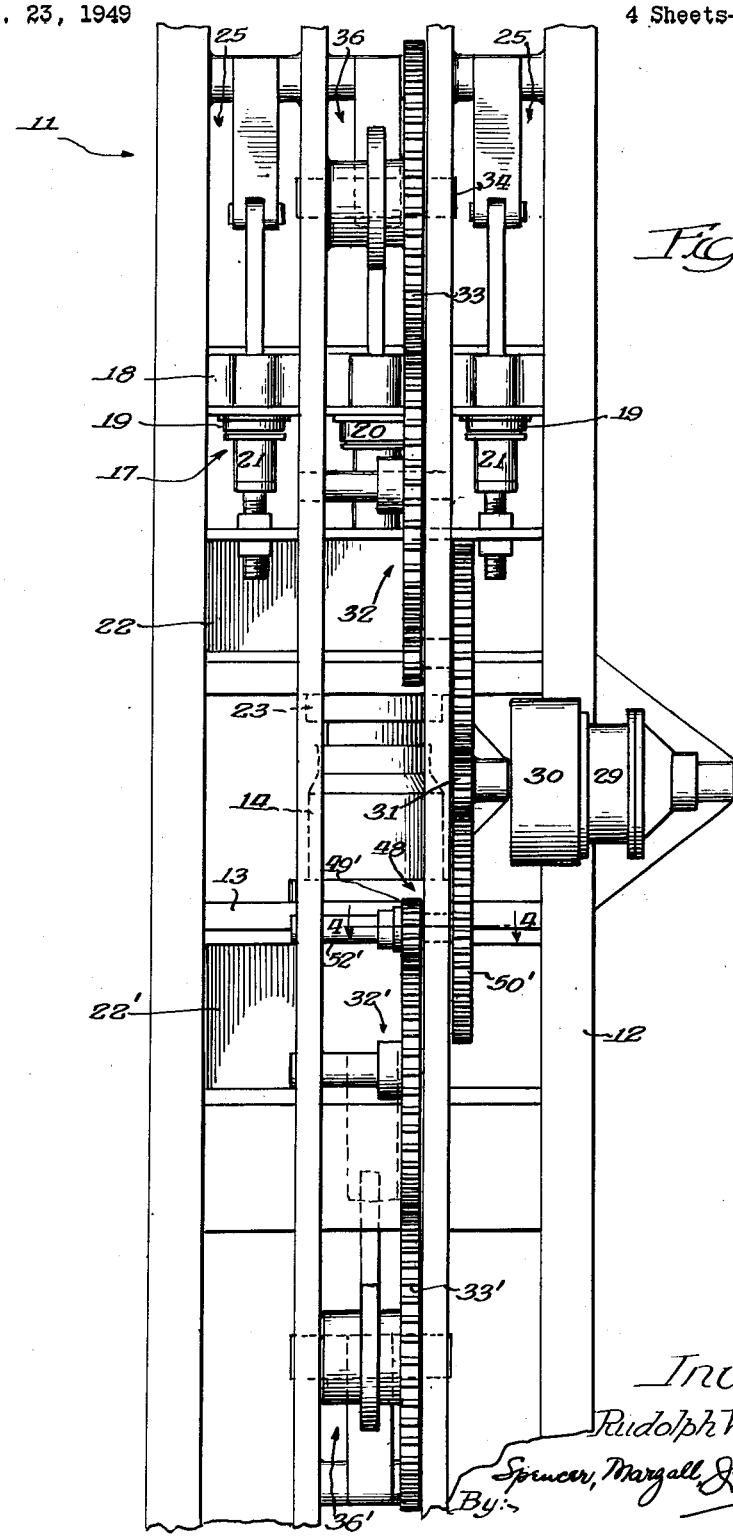
Fig. 3 shows the press as viewed from the right hand side in Figs. 1 and 2.

Fig. 5 shows the press of Figs. 1-3 as viewed from the top, Figs. 1 and 2 being sectional views taken substantially along the line 1—1 in Fig. 5; and Fig. 6 is a fragmentary sectional view of the top of the press taken substantially along the line 6—6 in Fig. 5.

To illustrate the invention the drawings show a press 11 for forming work material into desired shapes, the press comprising a main frame 12 forming, in its medial portions, a suitable seat 13 for the reception and support of a forming die 14. This die, of course, may have any desired construction or selected configuration in conformity with the shape of the device to be produced by the operation of the press. As shown, the die 14 comprises a block, as of steel, provided with an upwardly opening cavity 15 for the reception of a work piece or blank of material to be formed in the die. The die may have a slidable member 16 disposed in the cavity 15 and yieldingly supported therein in the raised position illustrated in Fig. 1, as by suitable springs (not shown), or other suitable means including fluid pressure means for supporting and causing actuation of the member 16. When in the position shown in Fig. 1, the member 16 may serve to support a suitable work blank or disk in the cavity 15 above the member 16 in position to be worked. Any suitable or preferred die structure may be used in the press, the present invention being not limited to the features of the die per se.

The main frame of the press also may support suitable guide means 17 above the die seat. Said guide means may, as shown, comprise a horizontally extending support structure 18 with vertically extending sleeve members 19 and 20 secured therein, the sleeve 20 being centrally disposed with respect to the sleeves 19 of which, in the illustrated embodiment, there are four guide sleeves 19 disposed outwardly of and in equal circumferential spacement with respect to the central sleeve 20.

The sleeves 19 each support a vertical rod or pitman 21 slidably therein, the ends of said rods being all connected with a carriage frame 22 shiftably supported for movement beneath the guide frame 18, said frame 22 being supported on and vertically movable with and by said rods 21 above the die 14. The frame 22, in turn, supports a die cover or closure member 23 in position to cooperate with the die 14 and to close the cavity 15 thereof when the frame 22 is in lowered position, and to uncover the forming cavity of the die when the frame is raised to open position.

The die cover 23 may be formed with a cavity 24 to form with the cavity 15 a combined material forming pocket when the die parts 14 and 23 are in relatively closed position.

Any suitable or preferred mechanism may be employed to open and close the die at desired intervals. To this end the rods 21 above the frame 18 may be drivingly interconnected with a suitable source of driving power through suitable power transmission mechanism preferably including clutch means for controlling delivery of power from the source, through the transmission mechanism, for the opening and closing of the die.

Although the die in the illustrated embodiment is shown as a member 14, stationarily mounted in the frame 12, and a cover 23 movable above the member 14 to open and close the die, it will be apparent that the cover 23 may be mounted as a die element stationary in the frame while the die portion 14 may be supported for shifting movement in the frame beneath the cover 23; or both elements 14 and 23 may be disposed for shifting movement in the frame. To this end the die seat 13 may be carried on a lower support frame 22', which, like the frame 22, may be mounted for shifting movement, in the frame 12, by connection with lower pitmans like the upper pitmans 21, operating in sleeves like the sleeves 19, and supported in a subframe 17' mounted on the main frame 12. Such lower pitmans, of course, may be drivingly connected with a suitable power source, through suitable power transmission means for actuating the same at desired intervals.

A block or billet of material to be die formed in the press may be introduced into the die cavity when the die is open and caused to flow into desired shape in the die, after closure thereof, by the movement of one or more shiftable forming members therein, two opposed forming members 26 and 26' being shown in the illustrated embodiment, although it will be obvious that the material forming operation contemplated by the present invention may be accomplished with but one forming member if desired.

As shown, the forming members comprise each a stem longitudinally movable in an opening formed in the die, the stem 26 extending in an opening in the cover 23, and the stem 26' in an opening in the bottom of the die portion 14. The stems are secured, in preferably demountable fashion, on corresponding support frames 27, 27'. These support frames are preferably guided for movement on the main frame 12 and provided each with a stem portion 28, 28' forming a pitman. These pitmans each slidingly and guidingly extend in a corresponding sleeve 20, 20'. The pitmans are each drivingly connected, as shown in Figs. 1, 2 and 3, with a suitable source of actuating power. While separate power sources may be employed, the pitmans 28, 28' may both be driven from a common source, preferably comprising an electric motor 29 which may be conveniently mounted on the main frame. The motor 29 may be drivingly connected to reciprocally move the pitmans 28, 28' and the material forming members 26 and 26' mounted thereon. While any suitable or preferred transmission means may be employed, the motor 29 is preferably connected through clutch means 30 to drive a pinion 31 and preferably separate trains of gears 32 and 32', one for each of the pitmans 28 and 28' and suitably mounted on shafts supported on the main frame.

One of the driven gears of each train, namely the gears 33 and 33', respectively supported on corresponding shafts 34 and 34', suitably journaled on the main frame, may be connected to drive corresponding toggle mechanisms 36, 36', respectively connected to drive the pitmans 28 and 28'.

When the shafts 34, 34' are caused to rotate by operation of the clutch 30, the toggle mechanisms may be actuated by straightening the links thereof to move the same from the relatively bent position shown in Fig. 1 to the relatively straight position shown in Fig. 2, such movement thrusting or knocking the toggle connected pitmans axially in the sleeves 20 and 20' to thereby force the forming members 26 and 26' in the die to press the work material therein and cause the same to flow in the desired fashion, to form such work material, for example as shown at 70 in Fig. 2. The toggle mechanisms thus operate as co-called "knockers" to bump the forming members suddenly and with great force in the die in performing its material shaping function. It should be noted, also, that each of the toggle mechanisms comprising a "knocker" exerts its action accurately in alignment with the axis of longitudinal movement of the connected forming member, thereby eliminating side thrust forces thereon and applying all available force of the "knock" to form the work material in the die.

It will be understood, of course, that apparatus embodying the invention may comprise a die and but one forming member such as the member 26 or the member 26', actuated by mutiple opposed knocker mechanism of the sort herein shown. For many purposes, however, it may be desirable to utilize an auxiliary forming member such as the forming member 26' along with the principal forming member 26, and to actuate such added member by any suitable or preferred mechanism, including cam, crank, driving link or other usual actuating means. Where more than one former is employed, it is preferable to utilize multiple opposed knocker mechanism of the sort herein shown, driving each former in order to eliminate side thrust on all formers and thus improve overall precision performance of the press.

It will be noted that the forming members 26 and 26', in the illustrated embodiment, operate in opposition and in axial alignment, and that both members are actuated by preferably identical "knocker" mechanism which may be driven from a common power source, as shown, but which if desired may be actuated by power from separate sources. Both mechanisms, however, embody toggle thrust devices, preferably though not essentially of identical construction, for applying thrust forces upon the forming members. It will be noted also that the toggle mechanisms are arranged to apply each their thrusting force upon the forming members in line with the longitudinal axes thereof, without side thrust, to the end that the forming forces exerted by the members 26 and 26' will be in alignment with the direction of forming movement thereof.

In order to entirely eliminate side thrust forces on the forming member or members, the knocker mechanism for actuating either or both of the members 26 and 26' may comprise multiple opposed toggle mechanism. As shown the mechanisms 36 and 36' each comprise two diametrically opposed sets of toggle links, although the invention also contemplates the possibility of employing three or more mutually counterbalanced sets of toggle links comprising a knocker mechanism for actuating a former. As shown, however, each of the multiple opposed knocker mechanisms 36 and 36' comprises a pair of opposed actuating toggles 37, 38 and 37', 38', each comprising a pair of links 39, 40 and 39', 40'. These link pairs are pivotally interconnected respectively as at 41 and 41'. The links 39 and 39', remote from the toggle pivots 41 and 41', may be connected as by the pivots 42 and 42' with the associated pitman, the axes of the pivots 42 and of the pivots 42' being parallel and equally spaced on opposite sides of the medial plane of the pitman with which connected. The toggle links 40 and 40' remote from the toggle pivots 41 and 41', may be pivotally connected as by means of pivot pins 43 and 43' on the main frame of the press, the axes of the pivots 43, and of the pivots 43', being parallel and equally spaced on opposite sides of the medial plane of the pitman with which connected. One of the toggles of each mechanism, namely the toggle 37 of one mechanism and the toggle 37' of the other, may be drivingly connected, each by means of a corresponding connecting rod 44, 44', with an associated driving cam 35, 35', respectively mounted on the shafts 34, 34' for actuation by the motor 29. The other toggles, 38 and 38', respectively, may be connected each with a corresponding connecting member 45, 45', driven by corresponding cams 135, 135', respectively, on shafts 134 and 134'. Suitable driving means is provided for drivingly connecting the shafts 34 and 34', respectively, with the shafts 134 and 134', so that the toggles 37 and 38 may be straightened simultaneously, in opposing directions, to operate the pitman 26 connected therewith, without exerting side thrust thereon, the toggles 37' and 38' being likewise actuated simultaneously, to actuate the pitman 26' without exerting side thrust thereon.

To this end the shafts 34 and 134 may be provided with bevel gears both drivingly engaging corresponding bevel gears on a countershaft, which may be journaled on the main frame in position extending between the shafts 43 and 143 to drivingly interconnect the same. Similar bevel gears and countershaft may be provided to drivingly interconnect the shafts 34' and 134'. As shown in the drawings, however, the shafts 134 and 134' are provided with gears 133 and 133' corresponding to the driving gears 33 and 33', and said gears 133 and 133' are connected respectively with the gears 33 and 33' by gears 46, 47 and 46', 47', suitably journaled on the main frame, to thus drivingly interconnect the shafts 134 and 134', respectively, with the shafts 34 and 34' and thus cause the toggles 37 and 38 to operate in unison and the toggles 37' and 38' likewise to function simultaneously.

By incorporating the multiple opposed toggle thrust mechanism all possibility of side thrust on the forming member or members by the "knocker" mechanism is entirely eliminated, any side thrust applied by one toggle member of the pair being opposed and cancelled out by an equal and opposite side thrust applied by the other toggle. The same is true where three or more mutually opposed toggles are employed.

The present invention further teaches means for actuating the forming members 26 and 26' in any desired time relationship during the material forming cycle of the press. Timing of the operating movement of the forming members may, of course, be accomplished in various ways without departing from the spirit or scope of the present invention. For example, driving power may be supplied to the members 26 and 26' through separate clutches and means provided to operate the clutches in a desired fashion to cause simultaneous operation of the formers or operation of one in advance of or after the other. As shown herein, however, adjustable means 48 is provided in one or other of the gear trains between the driving pinion 31 and the connected "knocker" mechanism, so that the knocker driving transmission may be adjusted readily to cause one of said forming members to perform its operating stroke simultaneously with the operating stroke of the other forming member or in any desired advanced or retarded time relation with respect to the operating stroke of such other member.

To this end the adjustable means 48 preferably comprises facilities, as shown in Fig. 4, whereby a pinion 49', which drives a gear 51' of the gear train 32', may be adjustably turned to any required degree of angular adjustment and secured in adjusted position with respect to the gear 50' with which it is drivingly connected. To this end the gear 50' which is preferably drivingly connected with the pinion 49' is turnably journaled on a shaft 52', on which the pinion 49' is also turnably mounted. Bolts 53' may be used to secure the pinion 49' to the gear 50' in any desired relative angular relationship which is thus adjustable to time the operation of the formers.

In order to open and close the die, the rods 21 above the guide frame 18 may be drivingly connected with any suitable or preferred rod shifting means 25, driven from a suitable power source. In the illustrated embodiment shown in Fig. 6, the shifting means 25 comprises a set of toggles 54, one for each of the rods 21, and all interconnected with a suitable source of driving power. This power source may conveniently comprise an electric motor 55 (shown in Fig. 5) which, if desired, may be mounted on the main frame of the press.

The motor 55 may be and preferably is connected, through suitable clutch means 56, to drive a power shaft 57, preferably journaled in suitable bearings on the main frame 12. Any suitable driving means may be employed to actuate the toggles 54, from the shaft 57. As shown, the shaft may be provided with spaced driving pinions 58 thereon in position to drivingly engage driving gears 59 each journaled on a corresponding stub shaft 60 which also is preferably journaled in bearings on the main frame of the press. The shafts 60 may be provided each with a driving cam 61. Each of these cams serves to drive a pair of toggles 54 through a toggle driving member 62. To this end each of the toggles 54 may comprise a pair of levers 63 and 64 pivotally interconnected as at 65. The levers 63 remote from their toggle pivots 65 may be pivotally mounted on the main frame 12 of the press by suitable pivots 66, each in alignment with the longitudinal axis of the pitman 21 with which the toggle is connected. Each of the toggle levers 64, remote from its toggle pivot 65, is pivotally connected with its associated pitman by means of a pivot 67, the axis of which preferably extends in a vertical plane including the longitudinal axis of the connected pitman.

The toggles 54 are interconnected in pairs as by means of links 68, each connecting the toggle pivots 65 of a pair of toggles. One of the links 68 of each interconnected toggle pair, adjacent its toggle pivot 65, may be pivotally connected as by means of a pin 69 with a corresponding one of the cam driving members 62, or the members 62 may each be connected directly with a toggle pivot 65, of its associated toggle pair.

When the shaft 57 is caused to rotate by operation of the clutch 56, the shaft 60 will drive the cams 61, thereby straightening the toggles 54 from the relatively bent position shown in solid lines in Fig. 6 to the relatively straight position shown in broken lines in Fig. 2, such movement moving the shafts 21 simultaneously downwardly in the sleeves 19 to thereby close the die. Continued rotary movement of the shaft 57, driven by the motor 55, after the die has been closed, will result in opening the die by drawing the toggles to the bent solid line position of Fig. 6 (shown also in broken lines in Fig. 1) from the position as shown in broken lines in Fig. 2. The die, of course, should remain in closed position during the forming stroke of the associated member or members 26, 26'. This may be regulated by controlling the speed of the motor 55 or by controlling the clutch 56 to allow the die to "dwell" in closed position during the forming stroke or strokes of the member or members 26, 26'.

Although die opening and closing mechanism is shown only to operate pitmans 21 in the upper portions of the press, for actuating the die cover 23, for some purposes it may, as previously mentioned, be desirable to form the die seat 13 as a die carriage vertically shiftable on the main frame 12, like the carriage 22. Any suitable or preferred mechanism may be employed for advancing and retracting such shiftable die carriage to present the die 14 either in retracted inoperative position or in projected position. Such die shifting mechanism may comprise toggle means driven from a suitable power source of the sort and in the manner described in connection with the toggle mechanism 25 herein. The present invention also contemplates the desirable possibility of utilizing die opening and closing mechanism of any suitable sort or construction for shifting the upper die member 23 or the lower die member 14, or for shifting both of said members, in any desired timed relation, with respect to the operation of the formers, as by controlling the clutch means 56.

It will be seen from the foregoing that the present invention provides a forming press in which forming thrust may be applied, in "knocker" fashion, that is to say, suddenly and with great force, upon the forming member or members, by novel multiple toggle mechanism eliminating side thrust thereon and assuring delivery of maximum working force on the material being formed during the operating cycle of the press. Mechanism embodying the present invention also permits of the adjustment in the timing of forces applied by a plurality of forming members, operating on a common work piece in a die, whereby a desired flow of work material in a complex die may be accomplished with utmost precision. Mechanism embodying the present invention is exceedingly flexible in that it may be adjusted quickly and easily to exert forming pressures in a plurality of directions and in adjustably timed relationship whereby the press mechanism may be adjusted to accommodate dies of various complex character; and it is a feature of the press herein illustrated that the member 26' may be used either as a forming member in conjunction with the member 26 or merely as a means operable at the end of the forming stroke to eject the finished element after the same has been formed in the die by the forming stroke of the member 26.

It is thought that the invention and its numerous attendant advantages will be fully understood from the foregoing description; and it is obvious that numerous changes may be made in the form, construction and arrangement of the several parts without departing from the spirit or scope of the invention or sacrificing any of its attendant advantages, the forms herein disclosed being preferred embodiments for the purpose of demonstrating the invention.

The invention is hereby claimed as follows:

1. A forming press comprising the combination, with a main frame, a die for receiving a work piece, said die having a shiftable portion for opening and closing the die, and a forming member mounted for axial movement in forming the work piece in the die, of means for moving said shiftable portion comprising a plurality of spaced pitmans axially movable on said frame and disposed radially of and equidistant from the axis of said member, means for applying power from a suitable source to said pitmans to move the same in unison, means for actuating said forming member comprising a pair of pivotally interconnected links forming a toggle pivotally supported on and between said main frame and said forming member, driving means operable to straighten said toggle whereby to drivingly shift said forming member on said frame in the performance of its forming stroke, and means to maintain the pitmans in die closed position during the operating stroke of said member.

2. A forming press comprising the combination, with a main frame, a die for receiving a work piece, said die having a shiftable portion for opening and closing the die, and a forming member mounted for axial movement in forming the work piece in the die, of means for moving said shiftable portion comprising a plurality of spaced pitmans equidistantly surrounding said member, toggle actuating means for each pitman, means to operate the several toggle means in unison, means for actuating said forming member comprising a pair of pivotally interconnected links forming a toggle pivotally supported on and between said main frame and said forming member, driving means operable to straighten said toggle periodically whereby to drivingly shift said forming member on said frame in the performance of its forming stroke, and means to maintain the pitmans in die closed position during the operating stroke of said member.

3. A forming press comprising the combination, with a main frame, a die for receiving a work piece, said die having a shiftable portion for opening and closing the die, and a forming member mounted for axial movement in forming the work piece in the die, of means for moving said shiftable portion comprising a plurality of pitmans equidistantly surrounding said member, means for moving the pitmans in unison, means for actuating said forming member comprising a plurality of mutually opposed toggles, pivotally supported on and between said main frame and said forming member, and driving means operable to straighten said mutually opposed toggles simultaneously whereby to drivingly shift said forming member on said frame in the performance of its forming stroke.

4. A forming press comprising the combination, with a main frame, a die for receiving a work piece, said die having a shiftable portion for opening and closing the die, and a forming member mounted for axial movement in forming the work piece in the die, of means for moving said shiftable portion comprising a plurality of pitmans, means for moving the pitmans in unison, means for actuating said forming member comprising a plurality of mutually opposed toggles pivotally supported on and between said main frame and said forming member, and driving means operable to straighten said mutually opposed toggles simultaneously whereby to drivingly shift said forming member on said frame in the performance of its forming stroke.

5. A forming press comprising the combination, with a main frame, a die for receiving a work piece, said die having a shiftable portion for opening and closing the die, and a forming member mounted for axial movement in forming the work piece in the die, of means for moving said shiftable portion comprising a plurality of pitmans, toggle means for moving the pitmans in unison, means for actuating said forming member comprising a plurality of mutually opposed toggles pivotally supported on and between said main frame and said forming member, and driving means operable to straighten said mutually opposed toggles simultaneously whereby to drivingly shift said forming member on said frame in the performance of its forming stroke.

6. A forming press comprising the combination, with a main frame, a die for receiving a work piece, said die having a shiftable portion for opening and closing the die, and a forming member mounted for axial movement in forming the work piece in the die, of means for moving said shiftable portion comprising a plurality of pitmans, toggle means for moving the pitmans in unison, eccentric cam means for actuating said toggle means simultaneously, means for actuating said forming member comprising a plurality of mutually opposed toggles pivotally supported on and between said main frame and said forming member, and driving means operable to straighten said mutually opposed toggles simultaneously whereby to drivingly shift said forming member on said frame in the performance of its forming stroks.

7. A forming press comprising the combination, with a main frame, a die for receiving a work piece, said die having a shiftable portion for opening and closing the die, a forming member mounted for axial movement in forming the work piece in the die, and an operating member mounted for movement in the die in axial alignment with said forming member, of means for moving said shiftable portion comprising a plurality of pitmans, means for moving the pitmans in unison, actuating means for moving said forming member and said operating member in the performance of their operating strokes comprising a plurality of sets of mutually opposed toggles, one of said sets being pivotally supported on and between said main frame and said forming member, and the other of said sets being pivotally supported on and between said main frame and said operating member, and driving means operable to straighten the mutually opposed toggles of one set simultaneously to actuate said forming member and to straighten the mutually opposed toggles of the other set simultaneously to actuate said operating member.

8. A forming press comprising the combination, with a main frame, a die for receiving a work piece, said die having a shiftable portion for opening and closing the die, a forming member mounted for axial movement in forming the work piece in the die, and an operating member mounted for movement in the die in axial alignment with said forming member, of means for moving said shiftable portion comprising a plurality of pitmans, means for moving the pitmans in unison, actuating means for moving said forming member and said operating member in the performance of their operating strokes comprising a plurality of sets of mutually opposed toggles, one of said sets being pivotally supported on and between said main frame and said forming member, and the other of said sets being pivotally supported on and between said main frame and said operating member, and driving means operable to straighten the mutually opposed toggles of one set simultaneously to actuate said forming member and to straighten the mutually opposed toggles of the other set simultaneously to actuate said operating member, said actuating means also including adjustable means for advancing or retarding or equalizing the operation of one of said members with respect to the other of said members.

RUDOLPH W. GLASNER.

REFERENCES CITED

The following references are of record in the file of this patent:

UNITED STATES PATENTS

| Number | Name | Date |
|---|---|---|
| 38,767 | Stein | June 2, 1863 |
| 280,682 | Smith | July 3, 1883 |
| 2,054,428 | Klocke | Sept. 15, 1936 |
| 2,071,001 | Rode | Feb. 16, 1937 |
| 2,085,648 | Glassner | June 29, 1937 |

FOREIGN PATENTS

| Number | Country | Date |
|---|---|---|
| 15,992 | Great Britain | Oct. 8, 1890 |